United States Patent
Jensen et al.

(10) Patent No.: US 6,650,777 B1
(45) Date of Patent: Nov. 18, 2003

(54) SEARCHING AND FILTERING CONTENT STREAMS USING CONTOUR TRANSFORMATIONS

(75) Inventors: Del Jensen, Orem, UT (US); Stephen R. Carter, Spanish Fork, UT (US)

(73) Assignee: Novell, Inc.

( * ) Notice: Subject to any disclaimer, the term of this patent is extended or adjusted under 35 U.S.C. 154(b) by 0 days.

(21) Appl. No.: 10/222,495

(22) Filed: Aug. 15, 2002

Related U.S. Application Data

(62) Division of application No. 09/352,421, filed on Jul. 12, 1999, now Pat. No. 6,459,809.

(51) Int. Cl.$^7$ ................................................. G06K 9/46
(52) U.S. Cl. ........................ 382/203; 382/199; 382/200; 382/206; 382/209; 382/224; 382/242; 382/260; 382/305; 358/403; 707/3; 707/6
(58) Field of Search ................................ 382/103, 159, 382/170, 176, 180, 181, 190, 195, 197, 199, 200, 203, 206, 209, 219, 224–225, 227, 241–242, 254, 260, 276, 278, 305; 348/169; 358/403; 707/1, 2, 3, 6; 375/240.08, 240.09

(56) References Cited

U.S. PATENT DOCUMENTS

| | | | |
|---|---|---|---|
| 5,325,444 A | 6/1994 | Cass et al. ................... | 382/177 |
| 5,524,065 A | 6/1996 | Yagasaki .................... | 382/226 |
| 5,794,178 A | 8/1998 | Caid et al. ...................... | 704/9 |
| 5,821,945 A | 10/1998 | Yeo et al. .................... | 345/440 |
| 5,873,079 A | 2/1999 | Davis, III et al. ............... | 707/3 |
| 6,108,619 A | 8/2000 | Carter et al. .................... | 704/9 |
| 6,311,194 B1 | 10/2001 | Sheth et al. ................. | 707/505 |
| 6,415,282 B1 * | 7/2002 | Mukherjea et al. ............. | 707/3 |

OTHER PUBLICATIONS

Jain, et al "Object matching using deformable templates", IEEE, pp. 267–278, 1996.*
Faudemay, et al "Intelligent delivery of personalized video programmes from a video database", IEEE, pp. 172–177, 1997.*
Kupeev, et al "On shape similarity", IEEE, pp. 227–231, 1994.*
Geiger, et al "Dynamic Programming for Detecting, Tracking, and Matching Deformable Contours", pp. 294–302, 1995.*
Meier, et al "Segmentation and tracking of moving objects for content–based video coding", IEEE, pp. 144–150, Jun. 1999.*
Yang, et al "A similarity measure of deformable shapes", IEEE, pp. 1455–1459,1997.*
Ravela, et al "Retrieving images by similarity of visual appearance", IEEE, pp. 67–74, 1997.*
Vapillon, et al "Analyzing and filtering contour deformation", IEEE, pp. 267–271, 1998.*
Mehrotra, et al "Similar–shape retrieval in shape data management", IEEE, pp. 57–62, 1995.*

(List continued on next page.)

Primary Examiner—Daniel G. Mariam
(74) Attorney, Agent, or Firm—Marger Johnson & McCollom, P.C.

(57) ABSTRACT

Methods and systems are provided for locating objects within a content stream, by transforming prospective objects and evaluating the results to identify meaningful semantic values. Transformation is accomplished using various contour transformations, possibly in combination with other tools and techniques. The semantic values produced by contour transformation can be efficiently searched and classified against a dictionary of archetypes to identify objects and object features in the content stream. Contour transformations may be scale-invariant and/or rotationally invariant or otherwise symmetric, so that distinctions between content objects based on their scale or orientation are avoided.

7 Claims, 5 Drawing Sheets

OTHER PUBLICATIONS

Mehrotra, et al "Feature based retrieval of similar shapes", IEEE, pp. 108–115, 1993.*

Hsu, et al. discloses (A Knowledge–Based Approach for Retrieving Images by Content), IEEE, Aug. 1996, pp. 522–532.

Ozer, et al. (A Graph Based Object Description for Information Retrieval in Digital Image and Video Libraries), IEEE, Jun. 22, 1999, pp. 1–4.

Deng discloses (Ne Tra–V: Toward an Object–Based Video Representation), IEEE, Sep. 1998, pp. 616–627.

Smith, et al. (Searching for Images and Videos on the World–Wide Web), pp. 1–20, 1996.

Liu, et al. (Partial Shape Classification Using Contour Matching in Distance Transformation), IEEE, Nov. 1990, pp. 1072–1080.

Saber, et al. (Integration of Color, Shape, and Texture for Image Annotation and Retrieval), IEEE, 1996, pp. 851–854.

Chu, et al. (Knowledge–Based Image Retrieval with Spatial and Temporal Constructs), IEEE, Nov. 1998, pp. 872–888.

SurfWatch Allowed Key Patent, pp. 1–3; Nov. 16, 1998.

Methodology, pp. 1–5; 1997.

CANDID Executive Summary, Nov. 19, 1998.

Gudivada et al., "Design and Evaluation of Algorithms for Image Retrieval . . . ", 1995.

"Faulty Filters . . . ", pp. 1–8; 1997.

Smith et al., "Searching for Images and Videos . . . ", pp. 1–20; 1996.

Nes et al., "Region–based Indexing . . . ", 1997.

Han et al., "Image Organization and Retreival . . . ", 1996.

Method and Apparatus for Semantic Characterization, filed Jul. 2, 1998.

* cited by examiner

SEARCHING AND FILTERING CONTENT STREAMS USING CONTOUR TRANSFORMATIONS

This patent application is a divisional of U.S. patent application Ser. No. 09/352,421, filed Jul. 12, 1999, now U.S. Pat. No. 6,459,809, issued Oct. 1, 2002.

FIELD OF THE INVENTION

The present invention relates to systems and methods for identifying and cataloging objects within a content stream, and more particularly to a novel approach for locating non-textual objects within a content stream and obtaining for each object a meaningful semantic value.

TECHNICAL BACKGROUND OF THE INVENTION

New information is being stored at an ever-increasing rate on the Internet, on proprietary networks, in medical databases, in clip-art databases, in video databases, in art galleries, in civilian and military satellites, and on networks, to mention just a few locations. More and more content is being made available at these locations as they become bigger and more sophisticated. Much of the new content is non-textual, and non-textual content such as images, motion video, animation, simulation, audio, and the like will continue to be stored and used on networks. Thus, tools and techniques for identifying, measuring, filtering, monitoring, and otherwise using non-textual content are needed.

Current methods of searching, browsing, and retrieving images rely heavily on associated textual information. A picture, for example, will often have one or more words associated it in textual form, as keywords and/or a description of the picture. When someone wishes to find a particular image, a database search is performed with keywords pertaining to the desired image. If the image is not associated with the appropriate textual search terms, it might not be found. This is a problem, because similar images are often indexed under different search terms, even when one person does all the indexing for a given set of images.

Pictures with no explicit associated textual information are difficult for automated methods to index, sort, and filter, even though these operations are widely desired. For example, many people do not wish to have pornographic pictures displayed on their personal computers, so software has been developed that blocks certain Internet sites. As there are now millions of pages on the web, any blocking software must rely, at least in part, on automated methods. The sites are generally blocked by some combination of human-created filters and keyword searches, so sites that contain words considered objectionable are sometimes blocked inappropriately (e.g., medical or therapeutic sites) and some objectionable sites are not automatically filtered out.

The need to search image databases based on audio or visual content, as opposed to text labels associated with an image or recording, has been recognized for some time. Existing content-based search tools and techniques include, without limitation, template matching (a pixel level technique), texture comparison, average color comparison, color histogram analysis, shape comparison, image segmentation which interprets an image as a collection of items, characterizations based on bending energy, ellipticity, and/or eccentricity, and combinations of foregoing. One known combination uses a "probability density function" which characterizes an image using a combination of local color, texture, and shape.

Different approaches to content-based searches have different strengths. The usefulness of a given tool or technique for searching by non-textual context depends on many factors, three of which are rotational invariance, scale invariance, and reliability. Computational efficiency is also important, but it tends to become less of a limiting factor as computation devices grow increasingly powerful and less expensive.

Although some tools and techniques exist, it would be an advancement in the art to provide additional ways to search images according to their content without relying solely on keywords.

It would also be an advance to provide new search tools and techniques that are invariant as to scale and/or rotation.

It would also be an advance to provide a novel identification and cataloging method, which extends existing identification and cataloging methods and can be used together with existing identification and cataloging methods.

In short, it would also be an advance to provide new content-based search tools and techniques for use with images and/or other non-textual content, such as digitized sounds.

Such tools and techniques are disclosed and claimed herein.

BRIEF SUMMARY OF THE INVENTION

The present invention provides methods and systems for identifying and cataloging objects within a digital content stream according to recognizable features of the objects. The invention is versatile, in that it may be used on audio and video content streams, as well as non-textual digital data sets of other types. Within a visual content stream, many different image formats may be used such as gif, tiff, RGB, grayscale, and others.

To characterize content in an image file or other data set, a series of similarly-shaped but different-sized contours are placed concentrically or otherwise nested around an "area" of interest. Conventional filters can be used to locate "areas" of interest. Then the "areas" under the nested contours are transformed using transformations which produce one or more semantic values. Some instances of the invention use a ratio of intermediate transformed values to arrive at the final semantic value. The semantic value may be expressed as a single number, a vector, a series of numbers, or as some other meaningful set of values which characterizes the content according to the contours and transformations used.

Note that an "area" may be a two-dimensional area because a data set may be a two-dimensional image, but in general the "areas" from which semantic values are derived may have any finite dimensionality. Likewise, contours are not necessarily one-dimensional, since they are grounded in mathematical relationships that may be multi-dimensional. That being understood, for convenience the quotation marks around the word area will be omitted from now on, both in describing the present invention and in claiming it.

The semantic value(s) provided by contour transformations are used to position the data set area within a dictionary of archetypes. These archetypal semantic values may have textual or database labels such as "nose", "Upper-Case A", or "snail", assigned to them. Semantic values which characterize one or more archetypes are compared with the semantic values derived from the new data set, to assign the data set to an archetype. If none of the archetypes fit the new data set within specified tolerances, a new archetype may be created with assistance from the user.

A "user" may be an administrator, or a non-administrative "regular" user. In either case, a user may be a person or it may be a software task or agent or other computer process acting legitimately on behalf of a person or a group of people.

Different content streams may be in different metric spaces, so a metric manager uses a series of metric definitions to characterize the metric space of a given content stream. The archetypes within the dictionary of archetypes are translated into the same metric space as the content stream using an archetype dictionary conversion means based on reverse contour transformation.

Once the content stream and the dictionary of archetypes are in the same metric space, an object finder is used to locate interesting objects (data set feature(s)), within the content stream. When something of interest is located, an object transformer transforms the data set within the content stream and assigns it a semantically meaningful value (or values). The values are then used to determine the object's identity relative to a dictionary of archetypes. Further refinement of the dictionary of archetypes and of the objects can be done using an object qualifier, which itself contains qualifier characteristics. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

Figure 1:
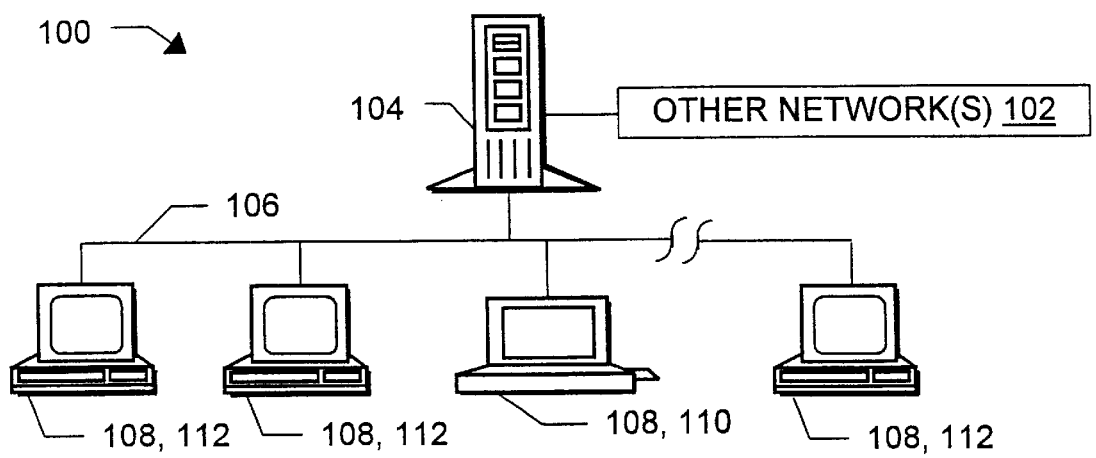
FIG. 1 is a diagram illustrating a network of computers which are individually and collectively among the many systems suitable for use with the present invention.

The present invention provides tools and techniques for identifying and classifying objects within a non-textual content stream. The content stream includes one or more images, audiovisual recordings, or the like, in files, blocks, bitstreams, packets, forming one or more digital data sets. The invention can be used as a substitute for conventional approaches when searching or filtering content streams, or it can be used to supplement conventional approaches. The invention may be used, for instance, in content filters which screen out objectionable materials during use of the Internet/World Wide Web, in search engines which locate images in a database matching specified content constraints, and in vision systems which provide input to manufacturing or other computer-aided processes.

Data Sets Generally

Suitable data sets for analysis according to the invention include two-dimensional pixel arrays; three-dimensional pixel sets, color pixels using RGB, HSV, or another color space; grayscale pixels; pixels obtained from an MFI, NMR, or CAT scan; audio stream data, and other digital data sets. Suitable images may be generated from raw data using familiar scientific visualization tools and techniques. Images from still pictures, video images, television images, images broadcast over the internet using video streaming techniques, 35 mm images, 16 mm images, without restriction, can also be utilized.

As used here, "digital" data sets generally include digitized data sets derived through analog-to-digital conversion. Digitizing involves obtaining samples having a position (in time and/or space) and also having values such as colors or grayscale intensity (for an image), or amplitude and frequency (for audio stream data). These samples are referred to as "pixels" in digitized images. Although digitized images are used as the primary example, other data sets can also be used according to the invention. Many file formats are used to hold digital data sets, including pictures in GIF (Graphic Interchange Format), TIFF (Tag Image File Format), JPEG (Joint Photographic Experts Group), IPX, and other formats. Suitable audio file formats include the MP3, WAV, and other formats. Suitable audiovisual formats include MPEG, AVI (Audio Video Interleaved), MOV, and others. A wide variety of other digital data sets are known to those of skill in the art.

Images and/or other digital data sets are provided to embodiments of the invention in a content stream. One type of content stream is a communication line sporadically or continually transmitting content from one location to another. A content stream may also consist of a single image such as a photograph, an X-ray, or a single audio file.

Computers and Networks Generally

The invention may be used with individual computers, with suitable networks, or both. Suitable networks include local networks, wide area networks, and/or the Internet. "Internet" as used herein includes variations such as a private Internet, a secure Internet, a value-added network, a virtual private network, or an intranet.

FIG. 1 illustrates a network 100 which is one of the many possible networks suitable for adaptation and use according to the present invention. The network 100 may be connectable to other networks 102, including LANs or WANs or portions of the Internet or an intranet, through a gateway or similar mechanism, thereby forming a larger network which is also suitable for use according to the invention.

The illustrated network 100 includes a server 104 connected by communication links or network signal lines 106 to one or more network clients 108. Other suitable networks include multi-server networks and peer-to-peer networks. The server(s) 104 and client(s) 108 each include an addressable storage medium such as random access memory.

Suitable network clients 108 include, without limitation, personal computers; laptops 110, personal digital assistants, and other mobile devices; and workstations 112. The signal lines 106 may include twisted pair, coaxial, or optical fiber cables, telephone lines, satellites, microwave relays, modulated AC power lines, RF connections, a network link, a dial-up link, a portable link such as an infrared link, and/or other data transmission "wires" (communication links) known to those of skill in the art. The links 106 may embody conventional or novel signals, and in particular, may embody novel archetype and/or semantic value signals for cataloging, filtering, and other data set analysis tools and techniques as discussed herein.

The server(s) 104 and/or client(s) 108 may include a non-volatile program storage medium such as a magnetic or optical disk, ROM, bubble or flash memory. A suitable program storage medium includes a magnetic, optical, or other computer-readable storage device having a specific physical configuration. Suitable storage devices include floppy disks, hard disks, tape, CD-ROMs, PROMs, random access memory, ROM, flash memory, and other computer system storage devices, configured according to the present invention.

The physical configuration represents data and/or instructions which cause the computer system 100 to operate in a specific and predefined manner as described herein. Thus, the program storage medium tangibly embodies a program, data, functions, and/or instructions that are executable by servers and/or other computers to perform digital data set cataloging, filtering, and/or searching steps of the present invention substantially as described herein. Suitable software and hardware implementations according to the invention are readily provided by those of skill in the art using the teachings presented here and programming languages and tools such as Java, Pascal, C++, C, assembly, firmware, microcode, PROMS, and/or other languages, circuits, or tools.

Contour Transformations Generally

As noted, the invention uses contour transformations to obtain semantic values that characterize content in non-textual data sets. The semantic values reside in a metric space. As is well understood in the art, a metric space is a space of points which has an associated metric or distance function that assigns distances to pairs of points in the space. A space may have more than one associated metric, but any given metric function d(x, y) must satisfy conditions known as positivity, symmetry, and the triangle inequality for all points x, y, z in the space. According to positivity, d(x, y) is greater than or equal to 0; d(x, x)=0; and d(x, y) is greater than 0 if x does not equal y. According to symmetry, d(x, y)=d(y, x). According to the triangle inequality, d(x, y) is less than or equal to d(x, z)+d(z, y).

To determine how "close" two or more entities (points or sets of points) are in a space, a distance function d(x, y) is used as a measure. Closeness might be measured, for instance, to determine where in a dictionary of object archetypes a specific object should be included. "Distance" is a generalized idea of similarity or closeness, which may be implemented in various ways. For example, within the metric space $M=R^2$ (the plane) the "Euclidean" distance is defined by $distl((x_1,y_1),(x_2,y_2))=((x_2-x_1)^2+(y_2-y_1)^2)^{1/2}$. Another distance function is the "taxicab" or "city block" metric for the plane, which measures distance as if a city block grid were overlaid on the plane. A Hausdorff distance gives a measure of nearness between sets.

For a vector valued function F with continuous first order partial derivatives defined on $R^2$, the plane, or $R^3$, a three-dimensional space, the Divergence Theorem states that $$\int_c F \cdot ds = \int_v \operatorname{div} F \, dv \quad \text{(formula 1)}$$

where C is a simple closed surface, and V is the volume enclosed by C. This mathematical equality can be used to change a contour integral into a volume integral, or vice versa.

Formula 1 is used according to the invention for the specific purpose of facilitating calculations to obtain a single number (in this example) or a range or set of numbers that serve as semantic values which can then be used to group images or other non-textual data content into a dictionary of archetypes, perform filtering, and/or perform searching steps as described herein. The shape and orientation of the surface C characterize the semantic values obtained; some embodiments of the invention use spheres and circles, while others use elliptical shapes or other shapes. The Divergence Theorem has many, many other applications in engineering, physical and applied sciences, and other fields, which are outside the scope of the present invention.

The contour integral on the left of Formula 1 can be very costly to compute directly, but the corresponding volume integral is relatively easy to compute. Thus, the average behavior of F over a suitable boundary can be computed with relative ease. This contour-integral-to-volume-integral transformation ("contour transformation"), as applied in the context of the present invention, provides useful and concrete results in the form of semantic values suitable for partially or fully automatic identification and/or classification of digital data set contents.

Figure 2:
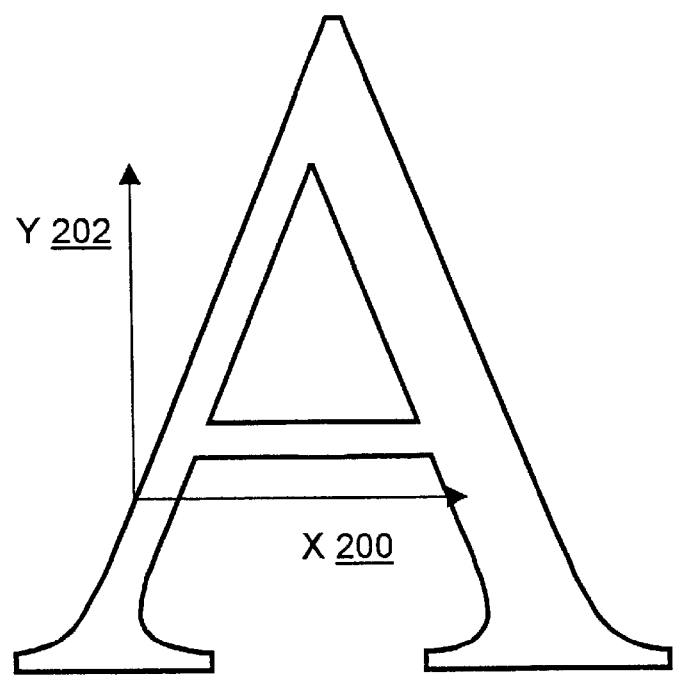
FIG. 2 is a diagram representing an image to be characterized according to the invention.

To illustrate how one might make use of the Divergence Theorem according to the specific requirements of the present invention, consider an example in the form of a digitized grayscale image, such as a scanned photograph or a radiological image. As noted, the invention may also be used to identify content in other digital data sets. As a particular example, FIG. 2 shows a line drawing or outline of a letter "A" with X and Y coordinate axes 200, 202 superimposed for reference.

A grayscale image may be represented as vectors or pixels, but the present discussion assumes for simplicity's sake that the image data set includes a rectangular array of discrete pixels, the pixels uniformly tile the logical view surface, and each pixel specifies a scalar value from a discrete range corresponds to represent the grayscale intensity at the pixel's location. One common grayscale range is the integer range [0–255], which corresponds to grayscale values that can be displayed on most video monitors, but grayscale values in other ranges, such as [0–4095] and [0–65536], may also be used.

Other color models than the grayscale model may also be used to define images in the content stream. For example, color pixel values can be defined as a composite number containing intensities of three different colors. An RGB scale or basis with basic color components red, green, and blue is commonly used, but other color spaces (such as the CMY scale composed of cyan, magenta, and yellow) also are known and suitable for use according to the invention.

As a practical matter, the idealized grayscale function intensity=$f(x,y)$ is generally approximated by a step function, where the intensity is constant over the regions $x_{(n-1)} \leq x < x_n$, $y_{(m-1)} \leq y < y_m$, $n \in \{1, 2, 3, \ldots N\}$, $m \in \{1, 2, 3, \ldots M\}$, the domain having been uniformly partitioned into N intervals in the X-direction and M intervals in the Y-direction which correspond to uniform pixels. There is no theoretical requirement that the pixels be uniform or rectangular, but in practice uniform and rectangular pixels are most often encountered.

Given the grayscale step function, one constructs an approximation to the vector field $$F(x,y)=[f_x(x,y), f_y(x,y)]$$

The vector function F will assume the role of the integrand for the expression on the left of Formula 1.

Figure 3:
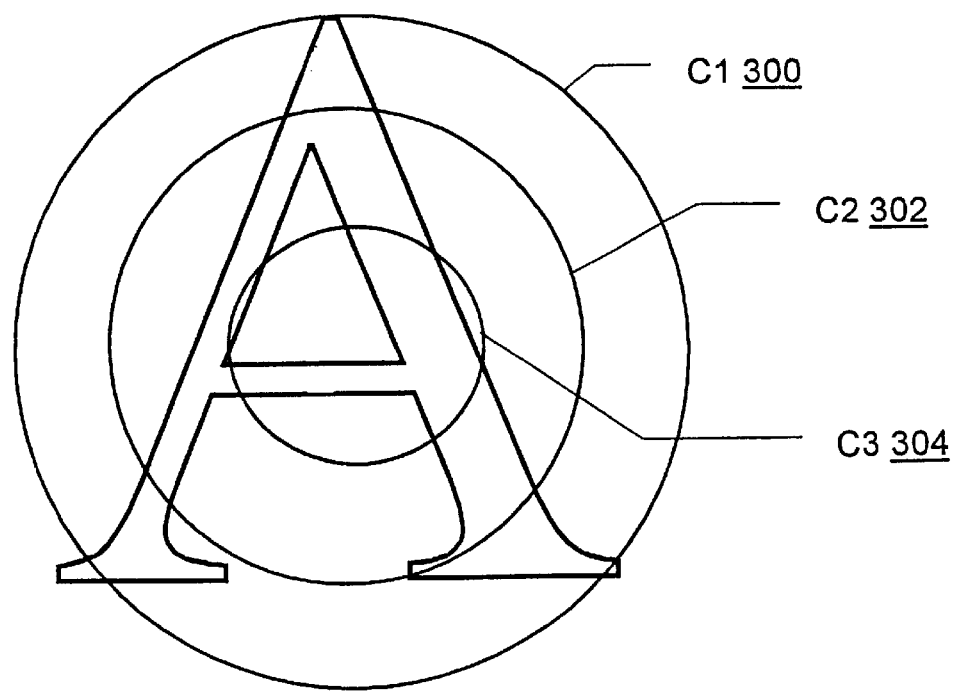
FIG. 3 shows the image of FIG. 2 with contours illustrating a method of the invention.

FIG. 3 shows the image of FIG. 2, with three contours indicated by concentric circles. Contour $C_1$ in Formula 2 below refers to a concentric circle 300, $C_2$ refers to a concentric circle 302, and $C_3$ refers to a concentric circle 304. For a spherically symmetric surface C, the expression $$C(F) = \int_c F \cdot ds \qquad \text{(formula 2)}$$

is invariant under rotation about the center of C. One can characterize a rotationally invariant object or object feature in an image's content using contour similarity class ratios. The scale-invariant vector $[u_1, v_1]$, is used where $u_1=C_1(F)/C_2(F)$, and where $v_1=C_2(F)/C_3(F)$.

The contours shown in FIG. 3 are spherically symmetric, but contours which are otherwise symmetric, and asymmetric contours, may also be used according to the present invention. Different contours provide different semantic values and hence different content characterizations. For example, ellipses with vertical major axes tend to be invariant under 180 degree rotations and vertical reflections, but "blind" in the horizontal direction, and so would be suitable for applications involving images with content having corresponding qualities.

The space $R^n$ (in this case, the real plane $R^2$) can be used as a metric for semantically ranking neighborhoods in the spatial domain of F against a dictionary of archetypes through the contour transformations $$u(n_f)=C_1(F)/C_2(F), \text{ and } v(n_f)=C_2(F)/C_3(F) \qquad \text{(formula 3)}$$

where $n_f$ is a connected, closed, bounded neighborhood in the domain of f, and F is the vector-valued derivative of f. A "neighborhood" of a given point x is a set of points within some distance of the point x. A neighborhood is a generalization of the idea of a circle having a radius r and a center at the given point x. That is, the neighborhood of a point x is the set of all points y such that $d(x, y)<r$ for some $r>0$. A set is "bounded" if the entire set can be enclosed in a neighborhood of sufficiently large radius. A set is "closed" if the set contains all of its limit points. A point x is a "limit point" of a set S if every neighborhood of x contains at least one point of S, regardless of how small the neighborhoods of x become.

The contour transformation above, applied to a series of images, produces a single number or set of numbers per region of interest in each image. These semantic values can be interpreted to form a group of contour similarity classes when similar images are compared as a group. For example, the semantic values for pictures of "chairs" or "noses" or "X's", will tend to be grouped together. The contour transformation, therefore, defines contour similarity classes, and more specifically contour similarity classes which depend not only on the contour but also on ratios. Contour similarity classes (with or without ratios) can be used to form a dictionary of archetypes, which includes semantic values and corresponding interpretations in the form of text labels, database keys, or other indicia. For instance, a range of semantic values specified by the dictionary might define "chairs", while another range defines "noses", and so on. Regions may generally be used in some embodiments in the role of a range as discussed herein, and sets of semantic values may be used in the role of a single semantic value.

Figure 4:
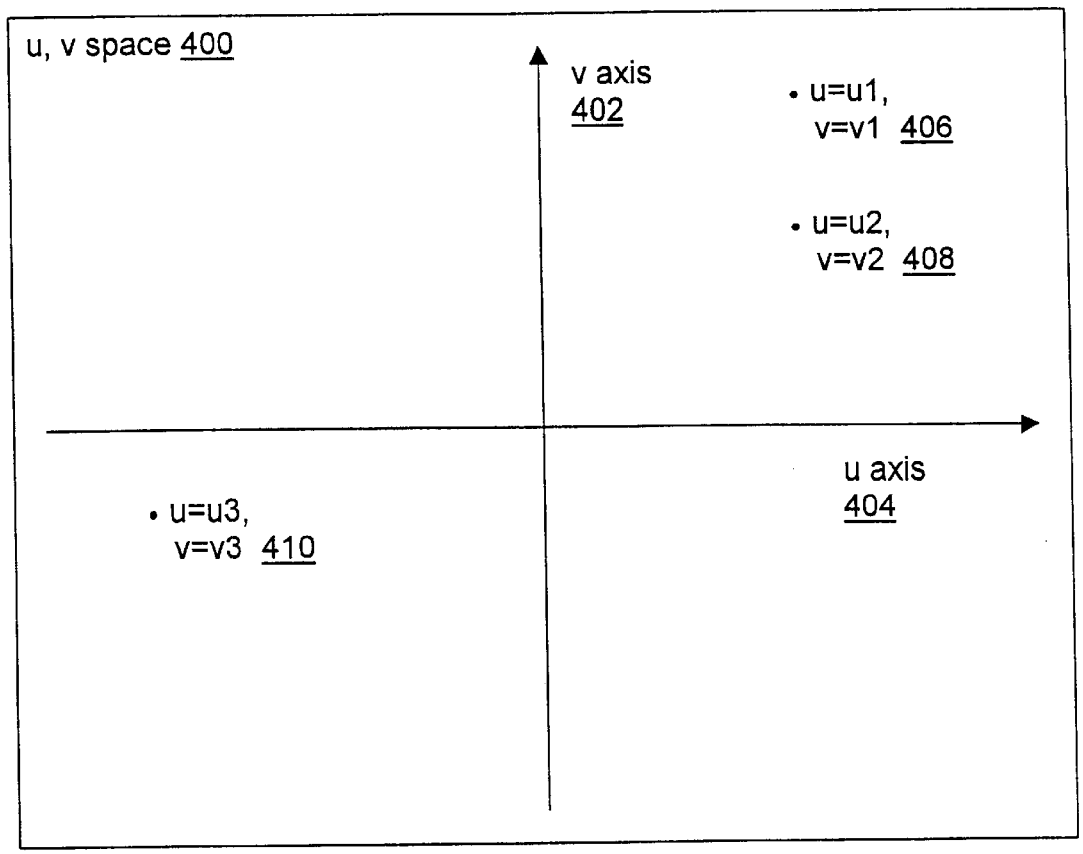
FIG. 4 is a diagram illustrating a space of semantic values which can be associated with images and other non-textual data according to the invention.

FIG. 4 illustrates a metric space 400 for a dictionary of archetypes. The space 400 is a u, v space having a V-axis 402 and a U-axis 404. The axes shown are at right angles to one another, but other orthogonal (non-parallel) axes may be used, and they may, of course, be labeled X, Y or otherwise instead of U,V. Although FIG. 4 illustrates a two-dimensional space, metric spaces of one or more dimensions may be used according to the invention.

When ratios of expressions of the form shown in Formula 3 are used, a dictionary of archetypes is defined according to the relative geometry of the contours, not by their absolute geometry. For example, in the case of the outline "A" shown in FIG. 3, any three concentric contours $C_x$, $C_y$, $C_z$, where $C_x/C_1=C_y/C_2=C_z/C_3$, will be compatible with the metric of FIG. 4. The ordered triple $(C_x, C_y, C_z)$ is similar to the triple $(C_1, C_2, C_3)$.

For example, consider a point (u1, v1) identified at 406 which maps under the u, v transform defined in Formula 3 to an "A", and a point (u3, v3) identified at 410 which maps to a "B" under the same u, v contour similarity class transform. Suppose a point (u2, v2) identified at 408 is a semantic value obtained from an image under the same u, v contour similarity class transform. Since (u2, v2) is closer to (u1, v1) than it is to (u3, v3), the corresponding content of the image from which (u2, v2) was obtained is more "A-like" than "B-like". Likewise, any connected, closed, bounded, region of the domain which is closer to the point at 406 than the point at 410 corresponds to image content that is more "A-like" than "B-like", at least according to the contour similarity class transform involved. Similar results hold when the digital data set involved is not an image.

Alternative embodiments of the invention use the contour transformation $$u(n_f)=C_1(F), v(n_f)=C_2(F), w(n_f)=C_3(F) \qquad \text{(formula 4)}$$

The (u, v, w) transformation shown in Formula 4 is linear, while the transformation in Formula 3 is not. The transformation in Formula 3 is scale-invariant under contour similarity, but may be less robust with respect to normalizing different non-linearities in the digitizing process to acquire the step-function $f$. In some cases and for some classes of digitizers, Formula 3 may be more robust than Formula 4.

A dictionary of archetypes metric, whether expressed via the transform shown in Formula 3 or the transform shown in Formula 4, is completely characterized by the contour similarity classes. Some similarity classes may be "well-conditioned" in that the dictionary elements are uniformly distributed and well spaced. Others may have non-uniform distribution but be useful nonetheless, with particular types of digital data or particular content objects or object features.

The three contours 302, 304, 306 may be placed using conventional methods that have been developed to locate the "most important" or "most interesting" parts of pictures. For example, boundary-finding algorithms exist that attempt to differentiate the subject of a picture from the background. Alternatively, the contours could be arranged around pixels chosen according to some predetermined sampling scheme which is used regardless of the content of the specific image being sampled.

The invention may be used in conjunction with existing neural net methods. For instance, contour transformations and images of starfish could be used to train the neural net to understand the generalized idea of a "starfish", to learn where the contours 302, 304, 306 should be placed in analyzing images that may contain starfish, and/or to learn what shape of contours work best with such images. The neural net could also be trained to determine when using ratios of contour similarity class functions (Formula 3) is likely to work better than not using them (for example, as with Formula 4).

Methods

The invention may be embodied in one or more methods, systems, signals, and/or configured storage media. Those of skill in the art will apply the teachings provided here to various embodiments as appropriate. In particular, unless clearly indicated otherwise the discussion herein of methods applies to systems, configured storage media, and signals according to the invention, and the discussions of systems, configured storage media, and signals also apply to the inventive methods.

Figure 5:
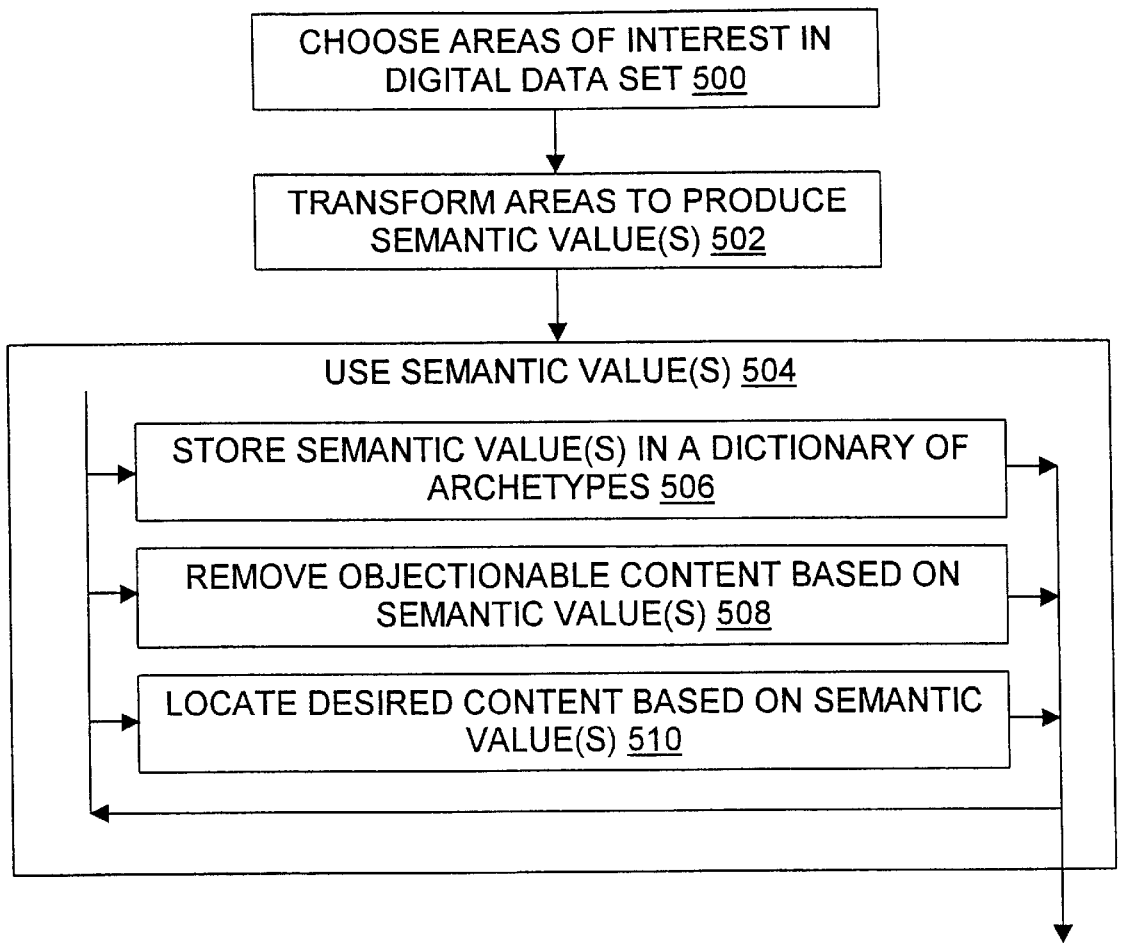
FIG. 5 is a flowchart illustrating methods of the present invention.

Some methods of the invention are illustrated in FIG. 5. During an area choosing step 500 at least two contour areas are chosen. This involves choosing the shape of the contour and its location relative to the digital data set contents. As used herein, "placing a contour" is synonymous with "choosing an area"; both phrases indicate that a portion of the digital data set has been chosen for contour transformation. As discussed above, each selected contour is connected, closed, and bounded, to permit use of the relationship shown in Formula 1. The contours may be symmetric, as shown in FIG. 3, or asymmetric.

At least two of the contours are generally nested, in that one is at least partially inside the other. If three contours are placed, then two levels of nesting can be used. For instance, the contours may be concentric circles or ellipses of different sizes. Nested contours may be placed from the inside contour outward, from the outermost contour inward, or in another order.

The contours are preferably placed around an "interesting" portion of the image or other data set. An interesting portion may be located, using various tools and techniques, including neural nets, texture comparison, average color comparison, color histogram analysis, shape comparison, or a combination of the above. For instance, skin-tones could define areas of interest in a filter designed to filter sexually explicit images according to the invention, and differences between satellite images taken of a given location at different times (indicating potential human or equipment movement) could define areas of interest in a filter designed to search for images of military value. In a facility which uses computer-aided vision tools and techniques to detect flaws in manufactured items, the camera and each item being inspected could be in a predetermined position relative to one another, so that the same portion of the resulting image is normally selected as the area of interest.

The data in the contour areas is transformed during a step 502 to produce at least one semantic value, as described above. Recall that some methods use contour ratios 514, such as those described in connection with Formula 3, and some methods do not, such as those described in connection with Formula 4. Either type of contour transformation produces at least one semantic value. A semantic value may be a scalar, or it may be a multi-dimensional vector or set.

During a using step 504, the semantic value(s) obtained with the contour transformations are used in one or more ways. For instance, the semantic values may be used to build a dictionary of archetypes during a step 506, to identify and block objectionable content during a step 508, and/or to search for particular content objects or object features in a database or other collection of images or other digital data sets during a step 510.

During the storing step 506, the semantic value produced by the contour transformation and/or associated information is stored within a dictionary of archetypes. This may involve comparing the new semantic value with semantic values for archetypes previously stored in the dictionary. For instance, if the semantic value is in a range or region of values belonging to an existing archetype ("noses" or "starfish", for instance) then the corresponding data set content object (or its address) might be added as one more example of that archetype. If the semantic value is more than a predetermined distance from any existing archetype's semantic value(s) then a new archetype could be added.

Archetype signals are discussed in connection with FIG. 7, but in general they may include one or more semantic values obtained from contour transformations plus a copy of the content object (or a pointer to it); an archetype may also contain a textual description or a list of keywords. The present invention can be used in a process which categorizes content and associates keywords with the content to permit subsequent searches using conventional text-based search engines, conventional relational or hierarchical databases, directory services such as Novell's NDS, or the like.

During the blocking or removing step 508, the semantic value produced by the contour transformation is used to block or reroute at least a portion of a digital data set. The portion may be an individual file, a record in a database, or an entire digital data set, for instance. This step 508 may use a dictionary of archetypes if several objectionable content objects, or several objectionable combinations of individually innocuous objects or features, are to be blocked or rerouted. For instance, a dictionary of archetypes could be used to identify sexually explicit images. However, in some embodiments a complex dictionary is not needed, because only the semantic values themselves and a fixed set of prohibited values are used. If the semantic value for a given portion of the content stream falls within the fixed set of prohibited semantic values, then that portion of the content is blocked or rerouted in a predefined manner. Conventional tools and techniques for preventing further transmission of data and/or rerouting data may be used.

During the searching step 510, the semantic value produced by the contour transformation is used to locate portions of the content stream containing objects that tend to give rise to semantic values near a target semantic value under the transformation in question. The relationship between content objects (or object features) and semantic values is not necessarily one-to-one, in that different types of content may map under a contour transformation to nearby semantic values. But a mapping from content to semantic values need not be one-to-one to be useful. By way of an analogy, conventional keyword searches sometimes produce unwanted results and sometimes fail to produce desired results, but they are still helpful and widely used.

FIG. 5 is meant to assist an understanding of the present invention, not to summarize every aspect of the invention or even every method. The methods, signals, systems, and configured storage media of the invention are defined by the claims, in view of the entire specification, not merely by FIG. 5. In particular, steps may be repeated, as when several portions of content are blocked or rerouted during repeated steps 508. Steps may also be omitted. For example, a filtering embodiment that performs step 508 might reference an existing dictionary of archetypes without performing step 506 to build the dictionary further. Steps may also be reordered or done concurrently, unless one step requires the result of a previous step. Moreover, steps may be grouped differently or renamed. As noted, some embodiments do not use ratios when transforming the data during step 502 while others do; these could be separately named steps in some embodiments. Some or all of these variations may be present in an embodiment, regardless of whether they are expressly described or shown as optional outside the claims.

Systems

Figure 6:
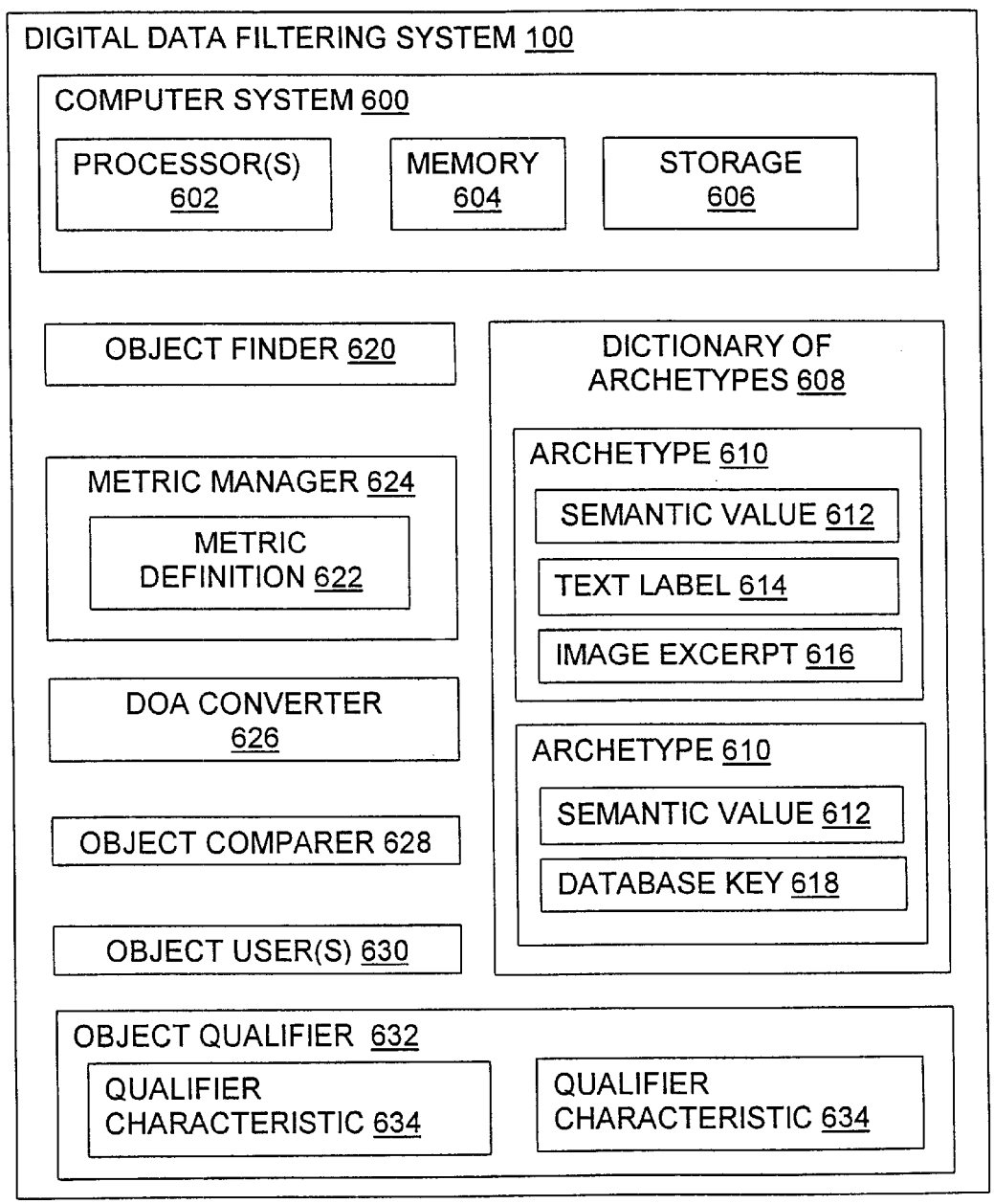
FIG. 6 is a diagram illustrating systems of the present invention.

A system 100 according to the invention is further illustrated in FIG. 6. Such systems use the semantic values produced by contour transformations of images and/or other digital data to "filter" data in various ways, as discussed in connection with step 504. Each system 100 includes one or more computer systems 600 having processor(s) 602, RAM or similar working memory 604 for the processor(s) 602, and nonvolatile storage 606 such as a hard disk. If multiple computer systems 600 are present in the system 100, the computer systems 600 may be individual nodes of a network such as a LAN, or the computer systems 600 may themselves be networks in a larger network, such as the Internet or a portion thereof, such as a LAN connected to the Internet, a virtual private network, and so on.

In various embodiments, one or more of the components discussed below are also present in the system 100. These components are shown separately for clarity of illustration, but those of skill will appreciate that the components may be implemented as data structures in one or more of the memories 604 and/or storage media 606, as code executable by the processor(s) 602 and stored in one or more of the memories 604 and/or storage media 606, or as a combination of data structures with code and processing hardware.

A dictionary of archetypes 608 may be used within a cataloging and/or searching system 100 to process content and identify objects. The dictionary of archetypes 608 may begin empty for a given content stream or user or session, and be built as archetypes 610 are added to it. Alternatively, the dictionary of archetypes 608 may already contain archetypes 610, and during a particular use may then be either static (read-only) or modifiable. As discussed, the content objects are not text but rather include some signal-type data that is defined by some n-space (e.g., color may be defined by a 3-space as RGB) and further characterized by being recognizable as objects, nested objects, and/or overlapping objects.

Each archetype 610 within the dictionary 608 includes a semantic value 612 produced by a contour transformation of content. The archetype 610 may include a single semantic value 612, a range or region of semantic values 612, or a set of discrete semantic values 612. The semantic value(s) from a newly transformed image (or a transformed image being presented to the dictionary of archetypes for the first time) is compared to the archetype 610 semantic values 612 to determine if the data set object(s) represented by the archetype 610 are likely to be present in the image. Comparison need not be done with every archetype 610 in every case, even if no match exists, because the archetypes 610 can be organized in ordered trees or hash lists or otherwise ordered according to their semantic values 612 to permit efficient searches of those semantic values 612.

For instance, if a semantic value from a given image is in (or within a specified distance of) the region of semantic values 612 belonging to an archetype 610 with a label 614 of "nose", then a nose is likely to be present in the image. When such a match exists, the archetype 612 may be updated in one or more ways. A counter in the archetype 610 may be incremented. A thumbnail, grayscale version, windowed subset, or other excerpt 616 of the image may be added to the archetype 610. A pointer, address, filename, index or other identifier may be added to help locate the image when the archetype 610 is given (or vice versa). A database key 618 for a relational, hierarchical, directory service, or other database may be used in addition to, or in place of, a textual label 614.

If comparison of the semantic value from a given image with semantic values 612 belonging to all archetypes 610 determines that no archetype 610 is matched, then a new archetype 610 containing the previously unmatched semantic value 612 may be created. The archetype 610 may be given its values, such as the values 612 through 618, entirely automatically and/or with human assistance.

An object finder 620 monitors a content stream to find areas of interest. The content stream could be a communication line 106 continually or intermittently holding content which moves from a source to a destination through the line, or the content stream could be some content repository whose data is not in transit (except as needed to feed the content analysis described herein). To find objects in these areas of interest, the object finder 620 uses a metric definition 622 that characterizes the content stream in any given n-space. Some embodiments of the invention contain several object finders 620, each of which corresponds to a different metric space through corresponding metric definitions 622. Metric definitions 622 are managed by a metric manager 624, in a manner analogous to the management of templates, handles, or other resources in conventional systems.

The object finder 620 is in communication with a DOA converter 626 which transforms prospective content stream objects into the same metric space as the dictionary of archetypes 608. An object comparer 628 is used to compare the semantic values resulting from the transform with the values 612 currently in the dictionary of archetypes 608, to identify objects which match one or more archetypes 610. In some instances of the invention, if no matching archetype 610 is found for an object, a new archetype 610 can be created and used to classify this object. The object finder 620 thus finds and identifies objects; it may also tag an identified object to the content in which it was found. This allows other modules or processes 630 to further analyze and use the content by referencing the tagged content in the context of the identified objects.

In particular, identified objects may be further manipulated or used by an object qualifier 632 which refines the dictionary of archetypes 608 and object identifications by further processing the identified objects against one or more qualifier characteristics 634. The object qualifier 632 closely scrutinizes the categories that exist and the objects whose values are known. If a better fit is found, then the contents in the dictionary of archetypes 608 can be modified, archetypes 610 can be added or deleted, or the values within the archetypes 610 can be modified. Objects thus qualified may be provided to users 630 and/or be used to discover additional characteristics that would further refine dictionary of archetypes 608 entries, better identify objects, and better define the qualifier characteristics 634. The refinement may be done with human assistance, through neural nets, statistical analysis, or other some process permitting finer distinctions to be made. For instance, an object might be characterized not only as a "nose" but as a "nose with a wart".

A given object user 630 can utilize the identified objects in various ways. In a searching system 100, the object user 630 utilizes the information in the dictionary of archetypes 608 to choose objects which have corresponding archetypes

610. For example, if a user desired pictures of seahorses, the object user 630 could choose those images stored within a seahorse archetype 610. If a more specific image was needed, such as a blue seahorse, then the qualifier characteristics 634 could be used.

FIG. 6 is meant to assist an understanding of the present invention, not to summarize every aspect of the invention or even every system. The systems of the invention are defined by the claims, in view of the entire specification, not merely by FIG. 6. Systems may have more or fewer individual components than are shown in the illustration. For instance, a single system may have many metric definitions 622, even though only one is illustrated. Likewise, at a given point in time a dictionary of archetypes 608 may hold zero or more archetypes 610.

An illustrated system component may also be omitted. For example, the object qualifier 632 and the qualifier characteristics 634 are not present in some implementations. Moreover, system components may be grouped differently or renamed. These variations may be present in an embodiment regardless of whether they are expressly described or shown as optional outside of the claims.

Signals

Figure 7:
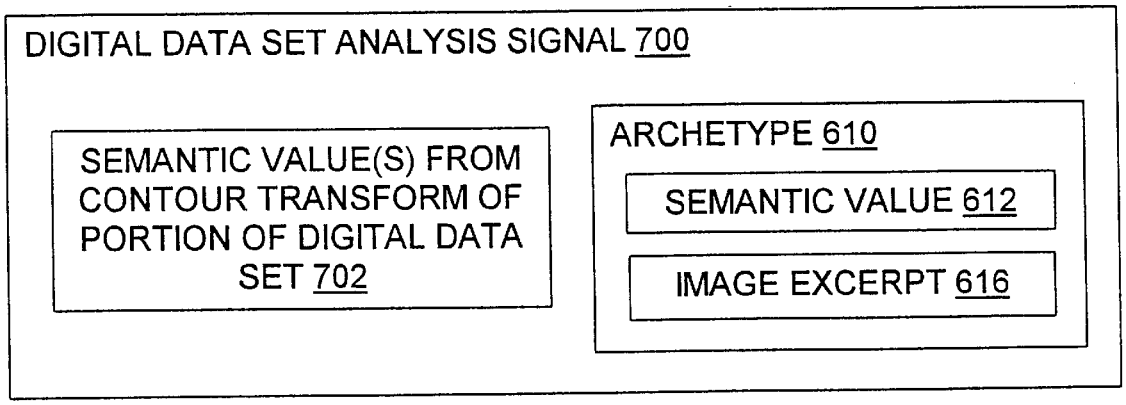
FIG. 7 is a diagram illustrating a signal according to the present invention for searching or cataloging non-textual objects and object features.

FIG. 7 illustrates a signal 700 according to the invention. The signal 700 may be embodied in a computer system 600, memory 604, storage 606, in a separate configured program storage medium, and/or in a communication link such as a network signal line 106. The signal may be used in filtering objectionable content, searching for desired content, building or modifying a dictionary of archetypes 608, and/or other non-textual digital data set analysis steps taught herein.

The illustrated signal 700 includes at least one semantic value 702 that is created when a prospective object in the content stream is transformed according to a method, discussed earlier. This semantic value 702 may be a scalar (integer or real), vector or other multi-dimensional number, a set of such values, or in another form known to those of skill in the arts according to the teachings herein.

The illustrated signal 700 also includes at least one archetype 610 with at least one semantic value 612. The illustrated archetype 610 includes an image excerpt 616 but other signal embodiments may include a text label 614, a database key 618, and/or other fields. For instance, fields such as timestamps, checksums, linked list or similar addresses, and the like may be present.

The signal 700 components are not necessarily stored contiguous to one another, or even in the same medium, although each necessarily resides somewhere in the system 600 and the components all exist at the time in question. An archetype 610 identifier is used in some signal embodiments to identify a current archetype 610 within the dictionary of archetypes 608 in connection with the transformation value (s) 702. This identifier may include a memory pointer (address) or an index into an array, such as a pointer or index into a list or array of archetypes 610.

FIG. 7 is meant to assist an understanding of the present invention, not to summarize every aspect of the invention or even every signal. The methods, signals, systems, and configured storage media of the invention are defined by the claims, in view of the entire specification, not merely by FIG. 7. Signal components may be repeated; for example, several archetype objects 610 may be associated with the semantic value(s) 702 in question. Signal components may also be omitted. For instance, one embodiment of the invention does not store an image excerpt 616 within the signal 700. Signal components may be stored in different orders or arrangements than that shown, and may be associated to form the signal by being stored together and/or by links such as pointers or table indices. Moreover, signal components may be grouped differently or renamed. These variations may be present in an embodiment regardless of whether they are expressly described or shown as optional outside the claims.

Summary

In summary, numerous context-based methods for cataloging or filtering images are known. However, the present invention provides context-based cataloging tools and techniques which supplement or replace other approaches by utilizing contour transformations. This makes it possible to identify objects and features in content streams in previously unknown ways.

Articles of manufacture within the scope of the present invention include a computer-readable storage medium in combination with the specific physical configuration of a substrate of the computer-readable storage medium. The substrate configuration represents data and instructions which cause the computers to operate in a specific and predefined manner as described herein. Suitable storage devices include floppy disks, hard disks, tape, CD-ROMs, RAM, and other media readable by one or more of the computers. Each such medium tangibly embodies a program, functions, and/or instructions that are executable by the machines to perform digital data set analysis steps substantially as described herein.

Although particular embodiments of the present invention are expressly illustrated and described herein, it will be appreciated that other embodiments may also be formed according to present invention. Unless otherwise expressly indicated, the descriptions herein of methods, signals, systems, or configured storage media, respectively, of the present invention each extend to corresponding embodiments in the other three forms.

As used herein, terms such as "a" and "the" and item designations such as "image" and "object" are inclusive of one or more of the indicated item. In particular, in the claims a reference to an item means at least one such item is required. When exactly one item is intended, this document will state that requirement expressly.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A data filtering system comprising:
    a computer system having a memory and also having a processor in operable communication with the memory, for accessing a content stream of digital data;
    an object finder which uses the computer system memory and processor to locate an object in the content stream, the object having at least one feature;
    a converter which uses the computer system memory and processor to transform the object using a contour similarity class transformation on a plurality of nested contours placed on the object, thereby producing a plurality of semantic values; and
    a filter which uses the semantic values to help a user of the data filtering system operate on the object according to at least one of the object's features.

2. The data system of claim 1, wherein the filter comprises a dictionary of archetypes and an object comparer which compares the semantic value produced by the converter with archetype semantic values and determines whether the compared values are similar.

3. The data filtering system of claim 1, wherein the filter uses the semantic value to help a user who is using the data filtering system to remove objectionable content operate on the object by filtering out from the content stream at least one of the object's features.

4. The data filtering system of claim 1, wherein the filter uses the semantic value to help a user who is using the data filtering system to search for desired content operate on the object by noting the location in the content stream of at least one of the object's features.

5. The data filtering system of claim 1, wherein the computer system comprises a computer network.

6. The data filtering system of claim 1, wherein the content stream includes at least one digital image.

7. The data filtering system of claim 1, wherein the content stream includes at least one digital audio data set.

* * * * *